(12) United States Patent
Giles

(10) Patent No.: US 12,408,634 B2
(45) Date of Patent: Sep. 9, 2025

(54) HYPER-REALISTIC HUMMINGBIRD FEEDER

(71) Applicant: Madison Giles, Sunnyvale, CA (US)

(72) Inventor: Madison Giles, Sunnyvale, CA (US)

( * ) Notice: Subject to any disclaimer, the term of this patent is extended or adjusted under 35 U.S.C. 154(b) by 0 days.

(21) Appl. No.: 18/402,610

(22) Filed: Jan. 2, 2024

(65) Prior Publication Data

US 2024/0224949 A1    Jul. 11, 2024

Related U.S. Application Data

(60) Provisional application No. 63/436,838, filed on Jan. 3, 2023.

(51) Int. Cl.
*A01K 39/02* (2006.01)

(52) U.S. Cl.
CPC ................................ *A01K 39/0206* (2013.01)

(58) Field of Classification Search
CPC .................................................. A01K 39/0206
See application file for complete search history.

(56) References Cited

U.S. PATENT DOCUMENTS

| | | | | |
|---|---|---|---|---|
| 5,269,258 | A | * | 12/1993 | Brown ............... A01K 39/0206 119/72 |
| 5,454,348 | A | * | 10/1995 | Colwell ............. A01K 39/0206 119/72 |
| D382,376 | S | * | 8/1997 | Bescherer .................... D30/124 |
| D454,669 | S | * | 3/2002 | Lieb ............................. D30/125 |
| 8,763,556 | B1 | * | 7/2014 | Vaughn, Jr. ........ A01K 39/0206 119/52.2 |
| 2017/0311575 | A1 | * | 11/2017 | Kong ........................ B44F 9/00 |
| 2018/0228132 | A1 | * | 8/2018 | Henehan ............ A01K 39/0206 |

* cited by examiner

*Primary Examiner* — Joshua J Michener
*Assistant Examiner* — Nicole Paige MacCrate

(57) ABSTRACT

A hyper-realistic hummingbird feeder with unique features replicating the natural characteristics of *Passiflora vitifolia* (red passionflower), such as artificial flowers and leaves that mimic *Passiflora vitifolia* in color and flexibility that are attached to and around the feeding ports, and the lack of a stable perch that allows hummingbirds to hover while feeding at flowers, which is consistent with natural hummingbird feeding behaviors. Additional features include a removable lid to which the artificial flowers and leaves are attached to, a clear nectar basin that can be easily refilled by the user(s), an insect moat to prevent nectar contamination, and a visible metal hook to hang the feeder from for easy access for both the birds and user(s).

6 Claims, 7 Drawing Sheets

Hyper-realistic hummingbird feeder

HYPER-REALISTIC HUMMINGBIRD FEEDER

BACKGROUND OF THE INVENTION

1. Field of Invention

The present invention relates to the field of hummingbird feeders with feeding ports with flowers made of foam materials to mimic real and natural flowers.

2. Description of Prior Art

There is no hummingbird feeder with a flat lid with three feeding ports that mimics real and natural flowers with a nectar holding base and no perching mechanism.

There are several prior art that the present inventor is aware of and they are:
- U.S. Design Pat. No. D382,376 issued on Aug. 12, 1997 to Robert E. Bescherer for "HUMMINGBIRD FEEDER" contains the flower is two-dimensional and is molded as part of the top lid.
- U.S. Pat. No. 5,454,348 issued on Oct. 3, 1995 to Colwell et al. for "HUMMINGBIRD FEEDER"
- U.S. Pat. No. 8,763,556 issued on Jul. 1, 2014 to William R. Vaughn, Jr. for "SOFT PETAL FLOWER PORT FOR HUMMINGBIRD FEEDERS"
- U.S. Pat. No. D454,669 issued on Mar. 19, 2002 to Robert Paul Lieb for "HUMMINGBIRD FEEDER" contains three-dimensional hard plastic ornamental flowers.

While these prior art related to the field of the present invention, they are not suitable nor have unique features of the present invention.

SUMMARY OF THE INVENTION

The hyper-realistic hummingbird feeder invention mimics natural red passion flowers (*Passiflora vitifolia*) promoting natural feeding behaviors (FIG. 1) by creating flowers with feeder ports that replicate natural *Passiflora vitifolia* and minimize the ability for the hummingbirds to perch while feeding.

The hyper-realistic hummingbird feeder has two main unique features that promote natural feeding behaviors, artificial flowers and leaves that mimic natural flowers and no built-in perch such as commonly found in many commercial feeders or prior art (FIG. 9).

Additional features of the hyper-realistic hummingbird feeder include a base that holds nectar that hummingbirds can consume with an insect trap preventing insects from consuming and contaminating the nectar, a hook by which the feeder can be hung from a branch or other suitable object that allows hummingbird safe and easy access to the feeder.

The hyper-realistic hummingbird feeder is easy to refill and clean, so it can be cleaned more frequently to minimize bacterial growth that may harm the hummingbirds.

BRIEF DESCRIPTION OF THE INVENTION

The drawings are for illustration only of the features, but do not limit the spirit or intent of the hyper-realistic hummingbird feeder design. Throughout these drawings the example flowers shown are *Passiflora vitifolia* (passion flowers) for illustration only.

DETAILED DESCRIPTION OF THE DRAWINGS

Although specific implementations of the present invention will be explained with reference to the drawings, it should be noted that these illustrations are simply examples of the various ways the principles of the present invention can be applied.

Figure 1:
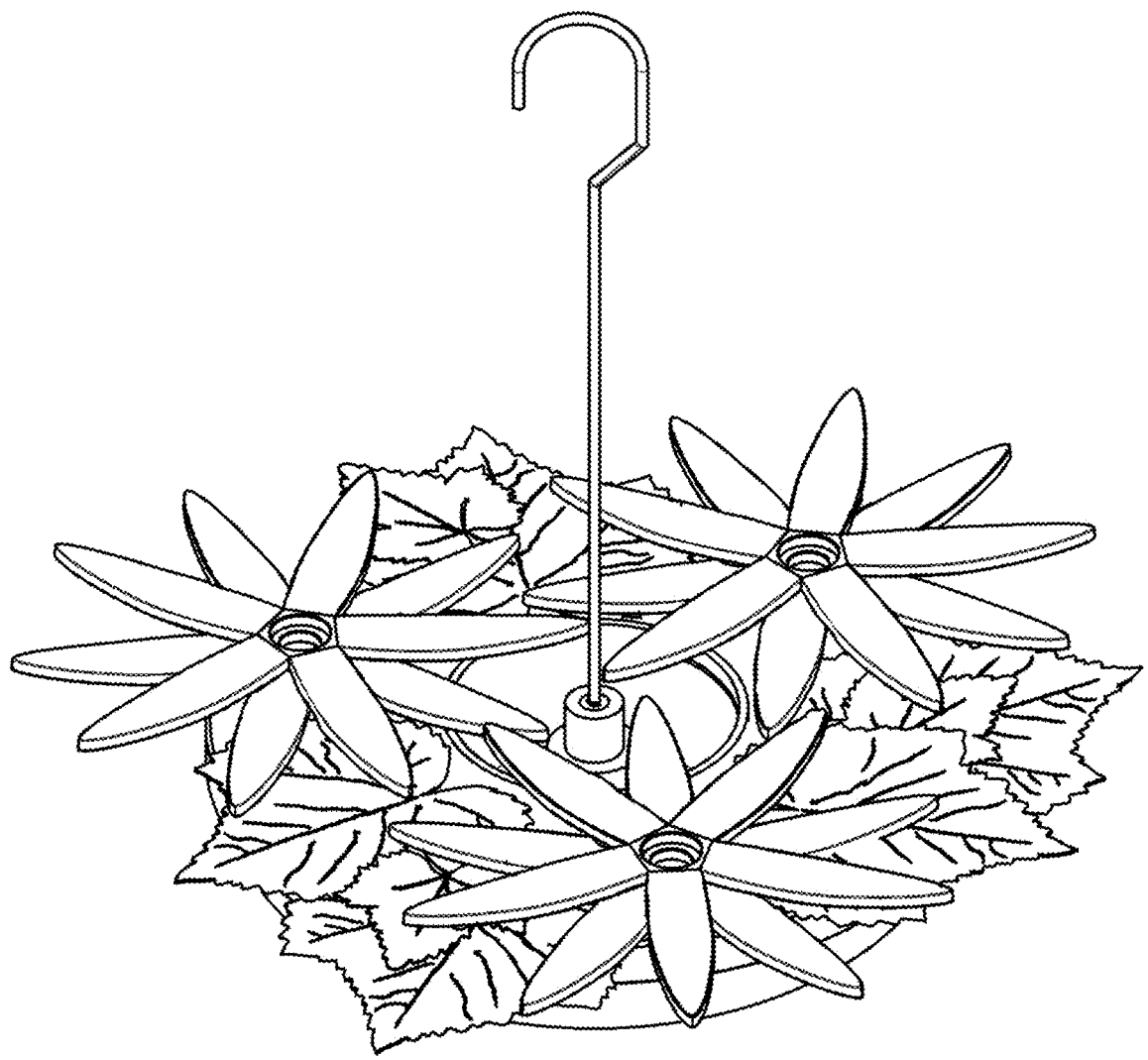
FIG. 1 is an isometric view of the completed present invention of a hyper-realistic hummingbird feeder fully assembled.

Referring to FIG. 1 is an isometric view of the completed present invention of a hyper-realistic hummingbird feeder fully assembled.

Figure 2:
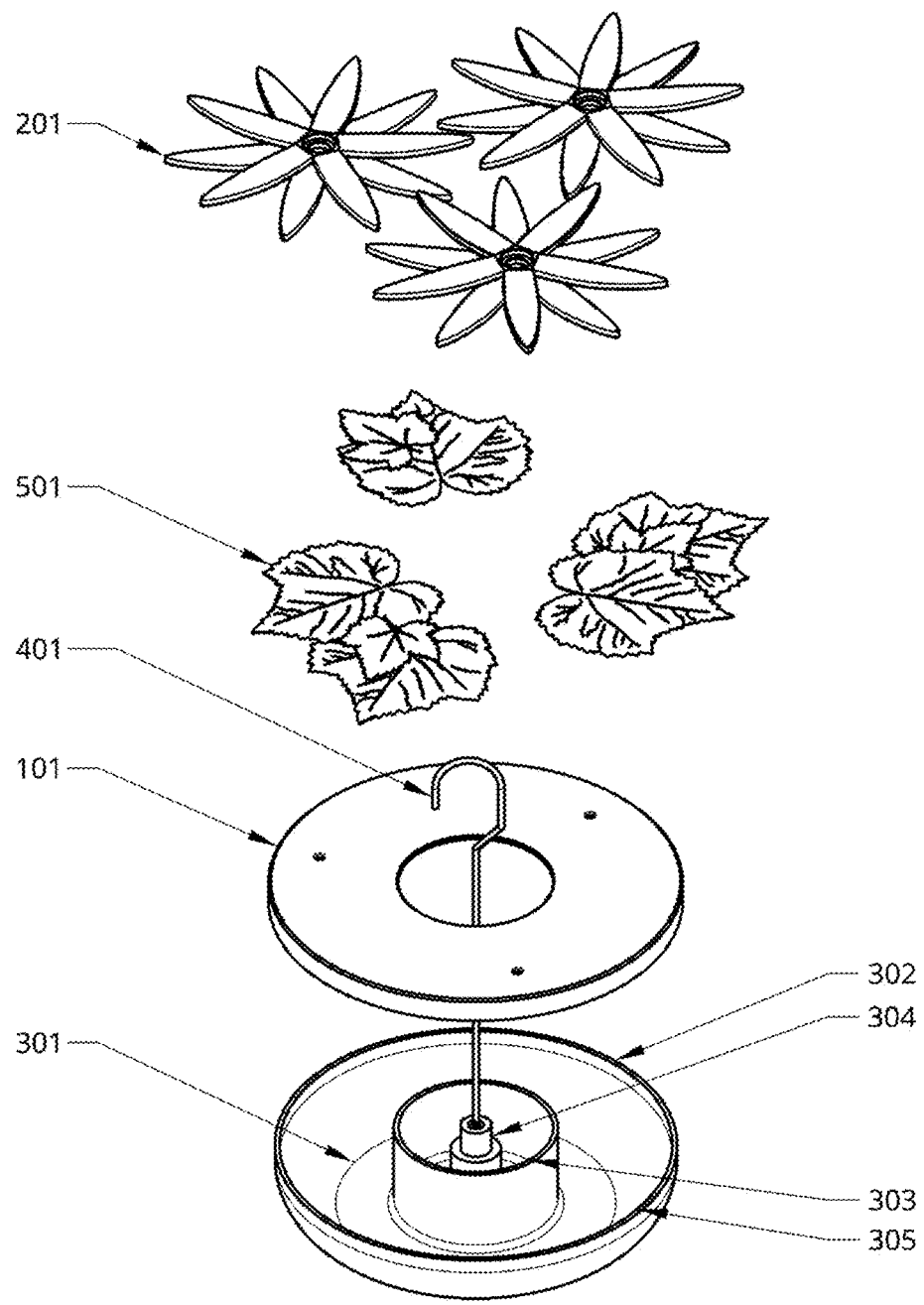
FIG. 2 is an exploded view of the hyper-realistic hummingbird feeder including the flat lid without perching mechanism, including three feeding ports with artificial passion flowers, the nectar holding base so that the hyper-realistic hummingbird feeder can be affixed to a tree or other object.

Referring to FIG. 2, an is an exploded view of the hyper-realistic hummingbird feeder that shows the components of the hyper-realistic hummingbird feeder. The artificial *Passiflora vitifolia* flower 201 and leaves 501, that are attached to the hummingbird feeder lid 101 during production. The lid fits onto the hummingbird feeder base 302. The base has a reservoir 301 to hold nectar, this has a surrounding lip 305 which goes into the corresponding lip on the lid, securing the lid to the base and allowing for easy removal for cleaning and refilling. The base has a second reservoir 303 acting as an insect prevention moat to prevent crawling insects from accessing the nectar. In the center of the base a threaded receptacle 304 allows a hanging rod 401 to be attached to the base so the complete hummingbird feeder can be hung from a suitable object.

In addition the hanging rod is surrounded by the moat 303 so crawling insects descending the hanging rod cannot crawl onto the lid and access the nectar through the feeding ports.

Figure 3:
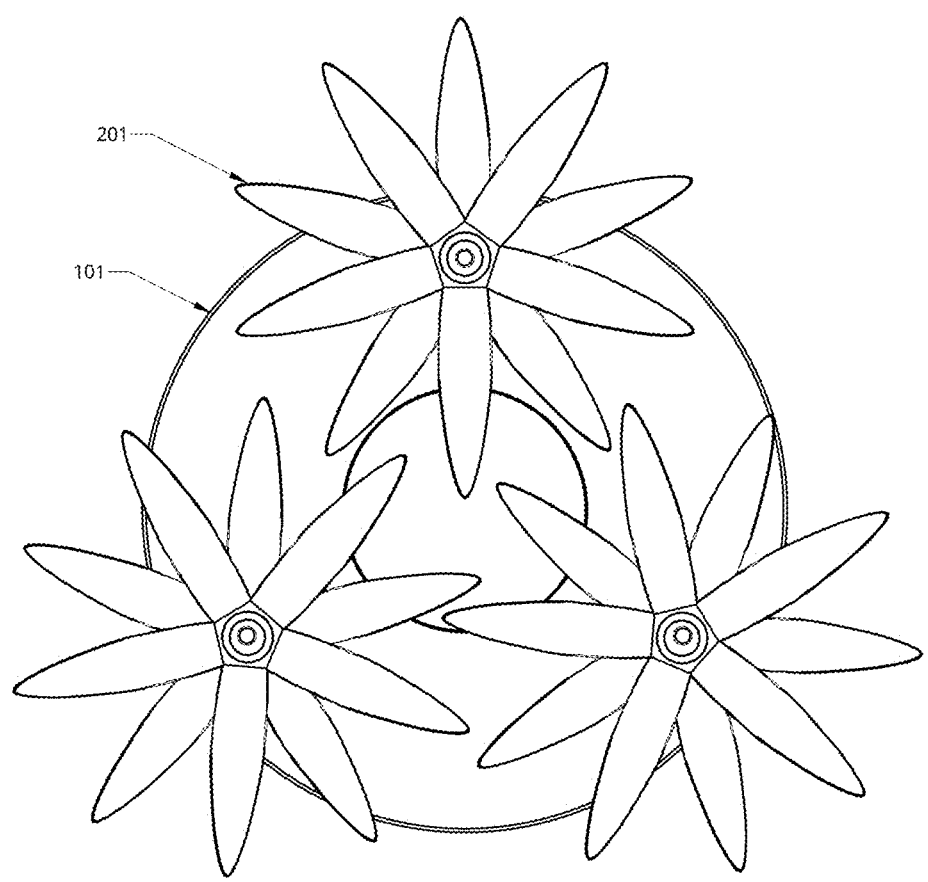
FIG. 3 is a top view of an hyper-realistic hummingbird feeder flat lid for the nectar holding base with three feeding ports and artificial passion flowers

Referring to FIG. 3 which is a top view of an assembled hyper-realistic hummingbird feeder flat lid 101 for the nectar holding base with three feeding ports and artificial passion flowers 201.

Figure 4:
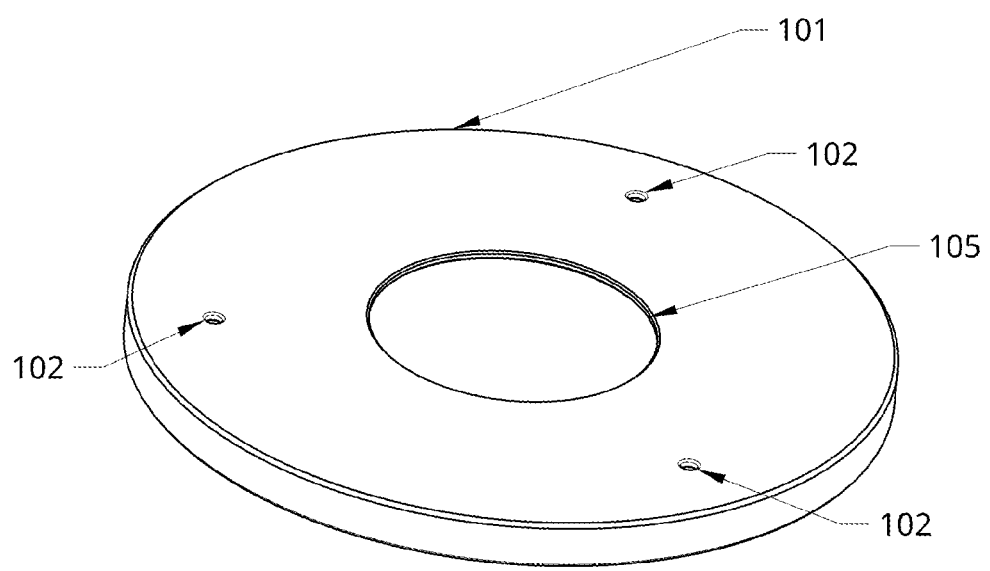
FIG. 4 is an isometric view of the hyper-realistic hummingbird feeder flat lid for the nectar holding base with three feeding ports without perching mechanism.

Referring to FIG. 4 an isometric view of the hyper-realistic hummingbird feeder flat lid 101, allows for flowers and other items mimicking the natural environment to be easily attached. In addition the flat lid minimizes the distance between the feeding port and the nectar. The minimal distance is consistent irrespective of the number or location of feeding ports on the lid. The feeding ports 102 are typically spaced equally around the lid. The feeding ports should be a shape and diameter that eliminates nectar access to flying insects and can be varied as needed. The central opening of the lid 105 allows the insect prevention moat of the base to pass through the lid. The lid is typically made of transparent plastic allowing for easy viewing of the nectar levels when in use.

Figure 5:
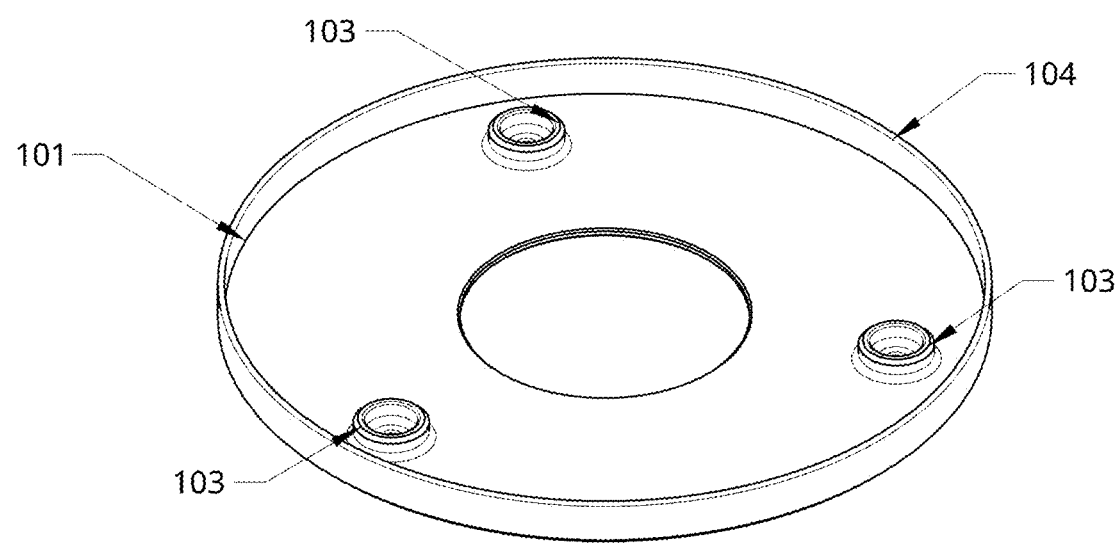
FIG. 5 is an isometric view of the underside of the hyper-realistic hummingbird feeder flat lid for the nectar holding base with three feeding ports without perching mechanism.

Referring to FIG. 5, an isometric view of the underside of the hyper-realistic hummingbird feeder flat lid 101 shows the feeding port chamber 103 mimicking the nectar chamber formed by the petals in a *Passiflora vitifolia* flower. The underside of the lid has a rim (4) which is greater than the diameter of the base, allowing the lid to be placed over the base and fit securely. Typically the lid is made of plastic in a color mimicking the natural environment. The lip 104 allows the lid to fit securely over the corresponding lip of the base 305.

Figure 6:
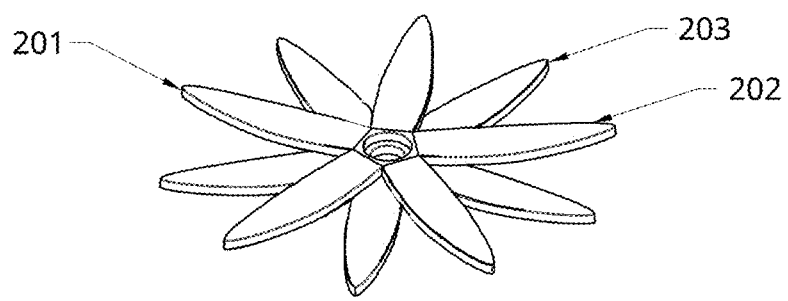
FIG. 6 is isometric view of the assembled artificial passion flowers (*Passiflora vitifolia*)
Figures 7, 8:
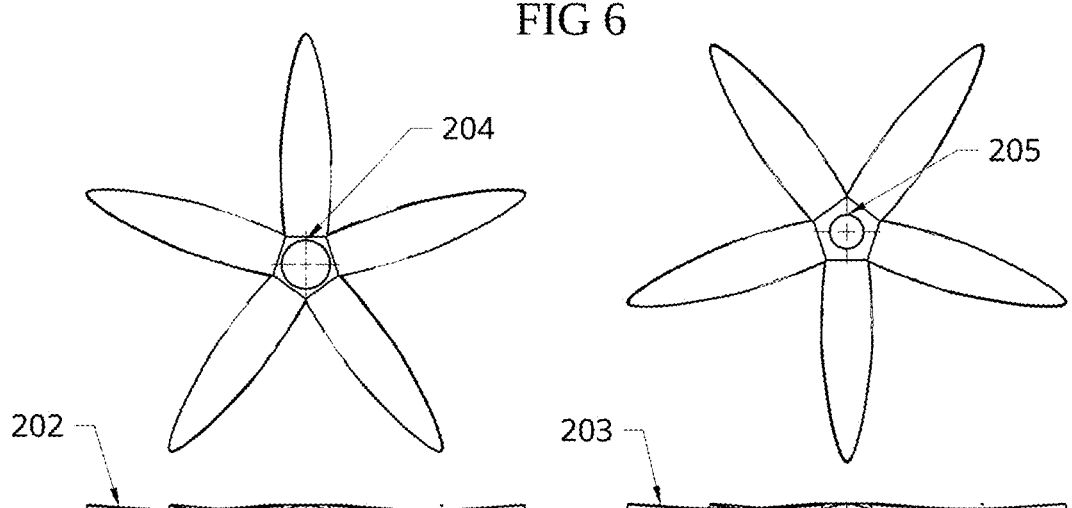
FIG. 7 is a top and side view of one set of petals of the artificial passion flower
FIG. 8 is a top and side view of one set of petals of the artificial passion flower FIG. 9 Prior art—hummingbird feeder with removable lid, hard plastic molded flowers, more than 3 feeding ports and perch.
Figure 9:

Referring to FIG. 6 the flowers 201 are designed to mimic a *Passiflora vitifolia*. The *Passiflora vitifolia* reproduction was made in two parts 202, 203 then attached together with glue and glued to the lid with a suitable adhesive. The reproduction flower is typically made from a flexible material such as craft foam that is stiff enough to retain a curved petal shape 202, 203 as shown in FIGS. 7 & 8, yet flexible enough to mimic a natural flower and importantly not easily hold the weight of a hummingbird, therefore not offering a place to perch while feeding. To provide easy access and allow for cleaning each petal has different size holes 204, 205 that when attached to the lid provide access to the feeding ports 102.

I claim:

1. A hummingbird feeder comprising:
   a circular basin that serves as a base, the basin having an inner ring and outer ring that is configured to contain liquid, wherein the outer ring encompasses the inner ring, and the inner ring forms at least a portion of a moat; wherein the basin comprises a connection location for an attachment pole; wherein the basin further comprises
   a complementary lid with a plurality of feeding ports, each with a flower to camouflage the feeder, wherein each flower comprises
   a petal structure comprising a plurality of petals configured to surround the feeding port, wherein at least one petal of the plurality of petals extends beyond an outer edge of said lid, wherein at least one different petal of the plurality of petals extends inward beyond an inner ring perimeter of the inner ring; and, wherein the petal structure is to retain a curved petal shape, yet unstable to function as a perch for a hummingbird.

2. The hummingbird feeder of claim 1, wherein the petal structure is shaped as an artificial *Passiflora vitifolia* with a central opening configured to be attached to a single feeding port of the plurality of feeding ports.

3. The hummingbird feeder of claim 1, wherein the petal structure comprises a red foam and a plurality of leaves are attached to the lid.

4. The hummingbird feeder of claim 1, wherein the basin further comprises a lip that provides a secure coupling to a corresponding surface of the lid.

5. The hummingbird feeder of claim 1, wherein the lid is removably coupled to the basin.

6. The hummingbird feeder of claim 1, wherein the lid further comprises leaves configured to further camouflage the feeder.

* * * * *